(12) United States Patent
Dehlsen

(10) Patent No.: US 9,506,451 B2
(45) Date of Patent: Nov. 29, 2016

(54) FLOATING, YAWING SPAR CURRENT/TIDAL TURBINE

(71) Applicant: Aquantis, Inc., Santa Barbara, CA (US)

(72) Inventor: James G. P. Dehlsen, Santa Barbara, CA (US)

(73) Assignee: Aquantis, Inc., Santa Barbara, CA (US)

( * ) Notice: Subject to any disclaimer, the term of this patent is extended or adjusted under 35 U.S.C. 154(b) by 0 days.

(21) Appl. No.: 14/682,700

(22) Filed: Apr. 9, 2015

(65) Prior Publication Data

US 2015/0260148 A1 Sep. 17, 2015

Related U.S. Application Data

(63) Continuation-in-part of application No. 14/217,060, filed on Mar. 17, 2014, now Pat. No. 9,334,849.

(51) Int. Cl.
*F03B 13/12* (2006.01)
*F03B 17/06* (2006.01)
*F03B 13/26* (2006.01)

(52) U.S. Cl.
CPC .......... *F03B 17/061* (2013.01); *F03B 13/264* (2013.01); *F05B 2240/93* (2013.01); *F05B 2260/02* (2013.01); *F05B 2270/20* (2013.01); *Y02E 10/28* (2013.01)

(58) Field of Classification Search
CPC ........ F03B 3/04; F03B 13/10; F03B 13/264; F03B 17/061; F03B 13/105; F05B 2240/97; F05B 2240/40; F05B 2240/917; F05B 2240/95; F05B 2270/18; F05B 2240/93; E02B 2017/0091; E02B 17/04; E02B 2017/0039; Y02E 10/38; Y02E 10/28; Y02E 10/226; Y02E 10/22; B63B 21/50; B63B 2035/4466; B63B 21/26; B63B 22/02; B63B 22/18; B63B 9/065; B63B 21/00; B63B 2021/001; B63B 21/502; B63B 2035/446; B63B 1/107; B63B 2021/505
See application file for complete search history.

(56) References Cited

U.S. PATENT DOCUMENTS 4,864,152 A * 9/1989 Pedersen ............... F03B 13/264
290/42
5,440,176 A * 8/1995 Haining ................. F03B 13/10
290/42

(Continued)

*Primary Examiner* — Igor Kershteyn
*Assistant Examiner* — Eldon Brockman
(74) *Attorney, Agent, or Firm* — San Diego IP Law Group LLP

(57) ABSTRACT

The present invention describes a floating yawing spar buoy current/tidal turbine. The spar includes a spreader above the rotor(s) with the spreader tips connected to fore and aft cable yokes that transition to opposing mooring lines connected to anchors on the seabed. The spreader comprises a yaw motor, which drives gears that engage with a ring gear fixed to the outer perimeter of the spar. Flow direction sensors activate the yaw motor for automatic yaw adjustments of the spar turbine. As tidal direction changes, the entire spar and turbine are yawed to maintain the rotor plane facing the tidal flow. The bottom end of the spar extends to approximately the bottom sweep of the rotor plane and contains a winched vertical mooring line, extending to the seabed and attached to a gravity or suction pile anchor. The turbine drive train can be accessed for servicing from the surface via hatches and ladders within the spar to enter the drive train and generating system vessel. The spar turbine is deployed by towing it in a horizontal position. At the operating site, the yokes are connected to the forward and aft mooring lines and the winch line is connected to the gravity anchor. The winch inside the keel draws the bottom end of the spar down and may be assisted by flooding the keel to reach a vertical position for the spar. The winch is then locked to retain required operating depth, or can actively control operating depth in areas of wide tide level range.

19 Claims, 16 Drawing Sheets

(56) References Cited

U.S. PATENT DOCUMENTS

| | | | |
|---|---|---|---|
| 6,091,161 A * | 7/2000 | Dehlsen | B63G 8/18 290/43 |
| 6,210,075 B1 * | 4/2001 | Korloo | B63B 1/048 166/345 |
| 6,431,107 B1 * | 8/2002 | Byle | B63B 21/502 114/264 |
| 6,856,036 B2 * | 2/2005 | Belinsky | F03B 17/063 290/42 |
| 7,215,036 B1 * | 5/2007 | Gehring | F03B 17/061 290/54 |
| 2006/0232075 A1 * | 10/2006 | Fraenkel | F03B 17/061 290/54 |
| 2006/0244267 A1 * | 11/2006 | Fraenkel | F03B 13/264 290/54 |
| 2006/0261597 A1 * | 11/2006 | Gehring | F03B 13/1885 290/44 |
| 2007/0215028 A1 * | 9/2007 | Lie | E21B 17/01 114/243 |
| 2007/0231072 A1 * | 10/2007 | Jennings | F03B 13/10 405/75 |
| 2008/0018115 A1 * | 1/2008 | Orlov | F03B 17/061 290/54 |
| 2009/0072544 A1 * | 3/2009 | Pao | B63B 21/50 290/55 |
| 2010/0074750 A1 * | 3/2010 | Henriksen | B63B 21/50 416/85 |
| 2010/0164230 A1 * | 7/2010 | Belinsky | F03B 17/063 290/54 |
| 2010/0183377 A1 * | 7/2010 | Fraenkel | E02D 27/52 405/232 |
| 2011/0140426 A1 * | 6/2011 | Garcia Lopez | F03D 11/04 290/44 |
| 2011/0179986 A1 * | 7/2011 | Nielsen | B63B 21/00 114/121 |
| 2013/0313831 A1 * | 11/2013 | Gehring | F03B 13/10 290/54 |
| 2013/0334823 A1 * | 12/2013 | Hopper | F03B 13/264 290/54 |

* cited by examiner

FLOATING, YAWING SPAR CURRENT/TIDAL TURBINE

CROSS-REFERENCE TO RELATED APPLICATION

The present application is a continuation-in-part application of and claims priority to U.S. patent application Ser. No. 14/217,060, filed Mar. 17, 2014, and entitled "Floating Tower Frame for Ocean Current Turbine System," the entire disclosure of which is incorporated by reference herein.

BACKGROUND OF THE INVENTION

1. Field of Invention

The present invention is directed to turbine systems for the generation of electrical power and/or the production of fresh water from ocean tidal and/or current (gyre) flows, and more specifically, to a floating, yawing spar tidal turbine.

2. Description of Related Art

Ocean currents are a major, largely untapped energy resource. The potential for ocean current electric power generation in the United States is as much as 185 TWh/yr., comprising both tidal and gyre currents, which have the advantage of delivering clean, renewable, predictable power to the coastal transmission grid, which are usually in close proximity to high load centers. Research and development in this area is driven by the need to generate electricity from renewable energy resources, particularly in view of the rising level of $CO_2$ and methane in the earth's atmosphere from the combustion of carbon fuels and the resulting disruptive impact on climate from global warming.

An ocean current is a continuous, directed movement of seawater generated by the forces acting upon this flow, such as breaking waves, wind, Coriolis effect, evaporation, temperature, salinity differences, and tides caused by the gravitational pull of the Moon and the Sun. Depth contours, shoreline configurations and interaction with other currents influence a current's direction and strength. Ocean gyre currents are relatively constant and near our coastlines, generally flow in one direction, in contrast to periodic tidal currents that reverse in flow direction due to gravitational forces. Harnessing a slow moving fluid to generate power has been effectively accomplished with wind turbines. While ocean currents move slowly relative to typical wind speeds, they carry a great deal more energy because of the density of water, which is more than 800 times that of air. The following table illustrates the average electrical power density as a function of wind or current flow speeds for a wind turbine or marine turbine, respectively.

| Wind Turbine | | Marine Turbine | |
| --- | --- | --- | --- |
| Average Wind Speed (typical range - m/s) | Average Power Density W/m² | Average Flow Speed (typical range - m/s) | Average Power Density W/m² |
| 6.0 | 132 | 0.99 | 498 |
| 7.5 | 258 | 1.20 | 886 |
| 8.5 | 376 | 1.43 | 1500 |
| 10.0 | 613 | 1.60 | 2101 |

With gyre currents, the constancy of flow also provides the opportunity for steady electric power delivery, compared to the intermittency of wind and solar. Because of these physical properties, ocean currents contain an enormous amount of energy that can be captured and converted to a usable form.

The United States, United Kingdom, Japan, and other countries are pursuing ocean current energy. Wind turbine technology is mature and generally adaptable to marine conditions, therefore the principal challenge to economically harnessing currents has been with the turbine platform topology and its station holding approach. For wide commercial deployment, turbines must be easy to transport, install, have accessibility to the turbine power deck for operations and maintenance, and generate power with levelized cost of energy (LCOE) comparable to wind turbines and photovoltaic systems.

For ocean current energy to be utilized successfully on a commercial scale, a number of engineering and technical challenges need to be addressed, including: avoidance of blade cavitation (bubble formation); prevention of marine growth buildup; reliability (since at-sea maintenance costs are potentially high); efficient methods of deployment; corrosion resistance; and anchoring and mooring methods. System reliability is of particular importance, since the logistics of at-sea maintenance is limited by accessibility, in windows of acceptable weather and sea-states, adding to the costs of maintenance services. Any system deployed in the ocean must be able to survive extreme waves and storms, which raises the capital cost and maintenance, and have minimal impact on the marine environment, such as fishing grounds, beach shoreline, and be compatible with ocean navigation.

Korean Patent No. 936907 to Kim discloses an ocean floor mounted, two rotor tidal electrical power generating system in which a main body automatically rotates so that a rotor always faces the tidal flow. This system is expensive due to the structural requirements necessary to resist the overturning moment of the whole structure due to the thrust load of the current on the rotors. This limits deployment to shallow locations. Installation is costly, since it is only possible to perform during short periods of time between tidal flows. This permanent type of installation makes it challenging to return the structure to the shore base facility for long-term servicing. Servicing just one rotor results in raising all the rotors above the surface and shutting down both rotors (not just the one requiring servicing) of the system resulting in significant loss of power production. Moreover, both rotors, even when in prime workable condition, must operate simultaneously since a shutdown of one rotor would turn the rotor support structure toward oblique alignment with the flow rather than squarely facing the flow, significantly reducing power production.

U.S. Pat. No. 7,307,356 to Fraenkel discloses a dual rotor marine current turbine mounted on the ocean floor. This system is also expensive due to structural requirements to deal with the overturning of the whole structure resulting from thrust load of the current on the rotors. Also, installation and securing to the ocean floor is only possible during short periods of time between tidal flows. Rotors and support structure can be raised for servicing, however all power generation is shut down if only one rotor requires servicing. Rotors and their support structure do not yaw. Rather, the blades reverse direction for change in tidal flow direction. This means that the rotors are not squarely facing the flow when the flow in one direction is a little different than the flow in the opposing direction resulting in reduced power production.

Great Britain Patent No. 2,447,774 to Fraenkel discloses a deep water current dual turbine system anchored to an ocean floor. If one rotor malfunctions, requiring servicing, the entire system must be shut down and brought to the surface. In a tidal flow, this would be difficult, as the flow in one direction drops off and waters calm, only a brief window in time is available for servicing operations before the flow reverses, at which point the whole anchored structure must swing around to an opposite position on the surface due to the opposite flow direction. There is no surface accessibility to the turbine drivetrains for servicing. This design appears costly, complex, and problematic to service. This design is based on the rotors downstream of the spar and yawing of the rotors to face the flow downstream of the spar. When the tide flow changes yawing is delayed until the flow is sufficiently strong, to drag the non-operating rotors around to a downstream position. The loss of one turbine operating will cause the balance of the turbines to yaw away from squarely facing the flow, significantly reducing the power generated by the whole system. This results in lost production and poor equipment utilization.

In summary, known prior art systems are not capable of producing cost-effective, utility-scale electrical power output to meet modern energy needs. What is needed is a system for efficiently capturing power from ocean or tidal currents, to generate electric power or produce desalinated water, which is cost effective to manufacture, deploy, and maintain.

SUMMARY OF THE INVENTION

The present invention overcomes these and other deficiencies of the prior art by providing a novel floating, yawing spar platform for a turbine generating system. The yawing, spar platform includes a spreader located above the rotor with the tips of the spreader serving as connections points, for the fore and aft cable yokes, which transition to fore and aft mooring lines connected to anchors on the seabed. The spreader contains one or more yaw motors driving gears, which engage with a ring gear on the outer perimeter of the spar. As tidal direction changes the spreader is held in a fixed position by the mooring lines and yokes. The entire spar and turbine are yawed against the fixed spreader to maintain the rotor plane facing the tidal flow. Flow direction sensors on the platform activate the yaw motor for automatic yaw adjustments to flow direction. The bottom end ("the keel") of the spar extends to approximately the bottom sweep of the rotor plane and contains a winched vertical mooring line, extending to the seabed and attached to a gravity or suction pile anchor. The turbine drive train deck can be accessed from the surface deck, via hatches and ladders within the spar. Deployment is performed by towing the spar turbine in a horizontal position by the winch mooring line and the spreader yoke cables. At the operating site, the yokes are connected to the forward and aft mooring lines and the winch line is connected to a gravity anchor. The winch inside the keel draws the bottom end of the spar down and may be assisted by flooding ballast tanks in the keel to reach a vertical position for the spar. The winch is then locked to retain required operating depth, or can be used to actively control operating depth in areas of wide tide level range.

In an embodiment of the invention, a current or tidal turbine comprises: a floating spar buoy including a keel at a bottom end; a spreader disposed on the spar, wherein the spreader comprises connection points for attaching one or more mooring lines connected to one or more anchors; the spreader may further comprise a yaw motor to react the spreader against the spar to effect yawing, and turbine and its power generating system disposed in a vessel integrated with the spar for converting current or tidal flow into electricity. A current or tidal flow direction sensor activates the yaw motor in response to a change in current or tidal flow direction. The spar may include a plurality of rotors within a rotor plane and the yaw motor rotates the floating spar about a vertical axis to maintain the rotor plane facing the current or tidal flow direction. The keel extends to the bottom of the rotor sweep and downstream of the operating rotor plane, and may comprise a winch attached to a vertical mooring line. The keel avoids any entanglement by the rotor with the vertical mooring line. The keel may further include a ballast tank. The spar buoy platform floats in a horizontal plane during towing to an operating site. Flooding of the ballast tank and activation of the winch draws the keel down and rotates the yawing spar platform into a vertical position. The operating depth from the ocean surface of the current or tidal turbine rotor is adjusted through the winch and helps maintain the rotor plane in a vertical position when under the thrust load of the current. The floating spar includes a hatch on the top deck above the waterline and internal ladders to permit serviceman access to the drivetrain, the electrical equipment, and the controls of the turbine.

In another embodiment of the invention, a current or tidal turbine comprises: a cylindrical floating spar, a turbine and drivetrain/power generating system within a vessel integrated with the cylindrical floating spar, a sensor for sensing a direction of water flow across the cylindrical floating spar, a spreader on the spar above the rotor, and a yaw motor fixed to the spreader to position the turbine in the sensed direction of water flow. In operation of the turbine, the cylindrical floating spar floats vertically with its top approximately ten to twenty percent (10-20%) above the water line and its bottom approximately eighty to ninety percent (80-90%) below the water line. The center of gravity of the current or tidal turbine is located below its center of buoyancy. A winch is located at a bottom end of the spar within the keel and is attached to a mooring line extending to the seabed. The spreader structure lateral ends are fixed to fore and aft cable yokes. The fore and aft cable yokes connect to mooring lines with anchors on the seabed. The spreader houses the yaw motor(s) and further comprises driving gears engaging a ring gear on an outer perimeter of the spar. The platform has a current flow direction sensor to activate the spar yawing system. The turbine rotor comprises variable pitch blades, which can be activated to shed the force of the current speed in excess of the system's rated power and to feather the blades completely for a safe shutdown of the machine. The turbine is serviced by personnel through an entrance hatch on the spar above the water line and a decent on ladders internal to the spar and to the drivetrain deck.

This present invention has significant advantages over existing tidal current turbines. First, currents are often relatively turbulent and flow faster closer toward the surface. Certain tidal turbines are mounted rigidly on the seabed and they are not able to operate in the higher, more energetic flow speeds near the surface. Furthermore, rigidly mounted structures require greater structural margins, which have significantly higher costs. The yawing spar turbine platform of the present invention floats with a portion of the spar above the water surface, but is resiliently stationed by mooring cables and can therefore flex to mitigate higher loads from wave turbulence and unusually higher speeds in the flow. Second, the cost of seabed mounted turbines can be extremely high due to the massive structure and foundation required, short windows of nil flow (still water) and the complexities and costs of underwater construction requiring specialized ships and cranes. The spar turbine of the present invention utilizes conventional anchoring systems providing substantial cost savings compared to seabed mounted. Third, the turbine of the present invention captures more energy in the tidal flow by passively adjusting its operating depth by means of rotor drag. As the tides change direction, the flow slows and virtually stops, then the counter flow starts to increase. With minimum flow the spar turbine is closer to the surface, since the rotor drag is less and the machine captures whatever energy is yielded in that flow. As the flow velocity increases, the rotor drag increases, and the mooring to the seabed creates a downward force which causes the spar buoy to reach a depth where the downward force of the moored rotor drag equals the upward force of the platform buoyancy. Higher flow speed results in more rotor drag driving the buoyant spar deeper. In this manner, the turbine operates more of the time in its design capacity range, than a turbine vertically fixed in the flow. Fourth, in certain prior art, a vessel on the surface rotates multiple arms with turbines, down below the surface to a vertical rotor operating position. Since this vessel operates on the surface this precludes adjusting the rotor depth to the current velocity for gains in turbine power production. The surface vessel is also subjected to extreme forces of high seas and turbulent wave action. The yawing spar turbine of the present invention has the special properties of a spar buoy where small ocean surface area is penetrated by the cylindrical spar structure, ideal for minimizing wave loading. The small surface area coupled with the mass of the spar turbine results in minimal heave of the system and stresses on the structure in destructive wave environments, allowing for a lighter structure with lower costs.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
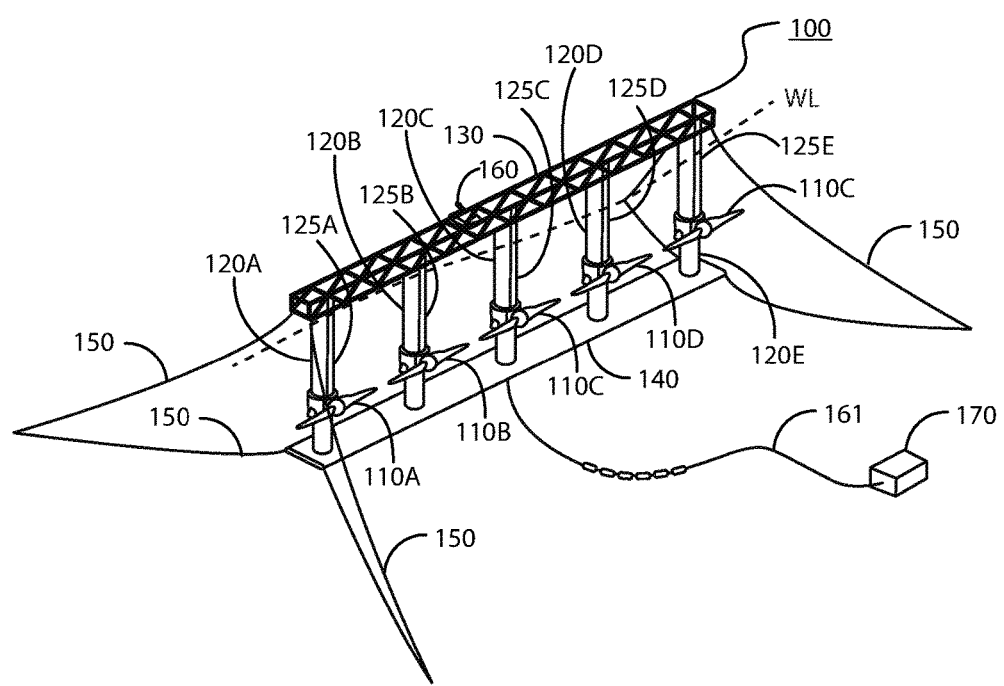
FIG. 1 illustrates an ocean current turbine system according to an embodiment of the invention.

Preferred embodiments of the present invention and their advantages may be understood by referring to FIGS. 1-16, wherein like reference numerals refer to like elements. The present invention may be utilized in any type of moving liquid, e.g., water flow, environment such as, but not limited an ocean current environment or tidal current environment. Although the present invention is described in the context of electrical power generation, it can also be used to provide high pressure seawater for reverse osmosis fresh water production.

FIG. 1 illustrates an ocean current turbine system 100 according to an embodiment of the invention. The ocean current turbine system 100 comprises a plurality of current turbines 110A-E and respective floating spar/towers 120A-E, each turbine 110 disposed on its own spar/tower 120. The spar/towers 120A-E are located (when in operation) between a top structural connecting member 130 above the water line "WL" and a bottom structural connecting member 140 below the water line. The top structural connecting member 130 can be either a truss, a beam, or other suitable structural element, the identification and implementation of which is apparent to one of ordinary skill in the art, to join spars/towers 120A-E together at one end. As shown, the top structural connecting member 130 is illustrated as a truss and therefore will be referred to as such in the remaining description even though other types of a structural connecting member may be used. The bottom structural connecting member 140 is a wing in a preferred embodiment. However, the bottom structural connecting member 140 can alternatively be a truss, beam, or other suitable structural element, the identification and implementation of which is apparent to one of ordinary skill in the art, to join spars/towers 120A-E together at the opposite end. As shown, the bottom structural connecting member 140 is illustrated as a wing and therefore will be referred to as such in the remaining description even though other types of a structural connecting member may be used. The towers 120A-E, truss 130, and wing 140 make a floating frame.

As shown, the system 100 includes five turbines 110A-E; however any number (greater than one) of turbines 110 with respective spar/towers 120A-E may be implemented. In operation, the turbines 110A-E are located subsurface near the base of the towers 120A-E and horizontal wing 140. This permits the center of gravity of the system 100 to be located in the bottom one-third of the spar/towers 120A-E near the wing 140, while the center of buoyancy is located in the top third of the spar/towers 120A-E below the water line and near the truss structure 130. When in operating position, the entire system 100 floats vertically, with respect to the spar/towers, and appears as a horizontal ladder floating with one side above the water surface. In an embodiment of the invention, the turbines 110A-E and spar/towers 120A-E are modular, which enables the system 100 to provide added turbine capacity by lengthening the truss 130 and the bottom wing 140. The turbines 110A-E may be located at the same relative height along the towers 120A-E or at different heights for added capacity per unit length of the frame.

As further discussed below, a turbine 110 may be moved coaxially up and down a respective spar/tower 120 along a track 125 by a motorized gear on the turbine base engaging with a linear gear along the track. Alternatively, the turbine may be moved coaxially up and down the spar/tower by cables and pulleys. Still alternatively, worm gears, hydraulic pistons, or other means may also be used to drive a turbine 110 along the track 125. The turbine track/drive is herein referred to as the elevator. The truss 130 may include an optional crane 160 that can move along the length of the truss 130 to raise and lower turbines 110A-E, remove the rotor, and handle other components. Power generated by the system 100 may be carried via a power cable 161 to an electrical transfer station 170, the implementation of which is apparent to one of ordinary skill in the art.

In an embodiment of the invention, a turbine 110 may comprise fixed pitch blades or variable pitch blades. Blade spoilers may be optionally implemented to limit the amount of lift created by the blades. In an alternative embodiment of the invention, one or more of the turbines 120A-E may be located on a respective tower 120A-E downstream of the current flow.

Figure 2A:
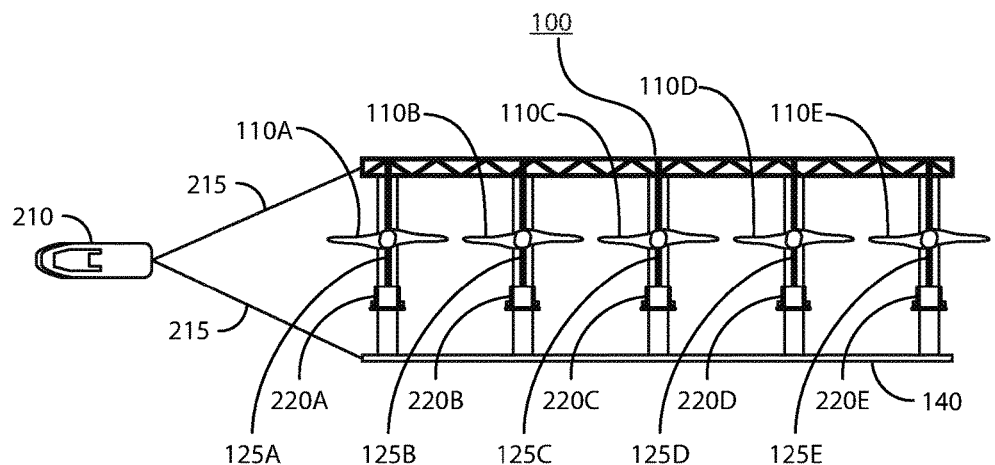
FIGS. 2A and 2B illustrates transportation and deployment of the ocean current turbine system of FIG. 1 to an operating site.
Figure 2B:
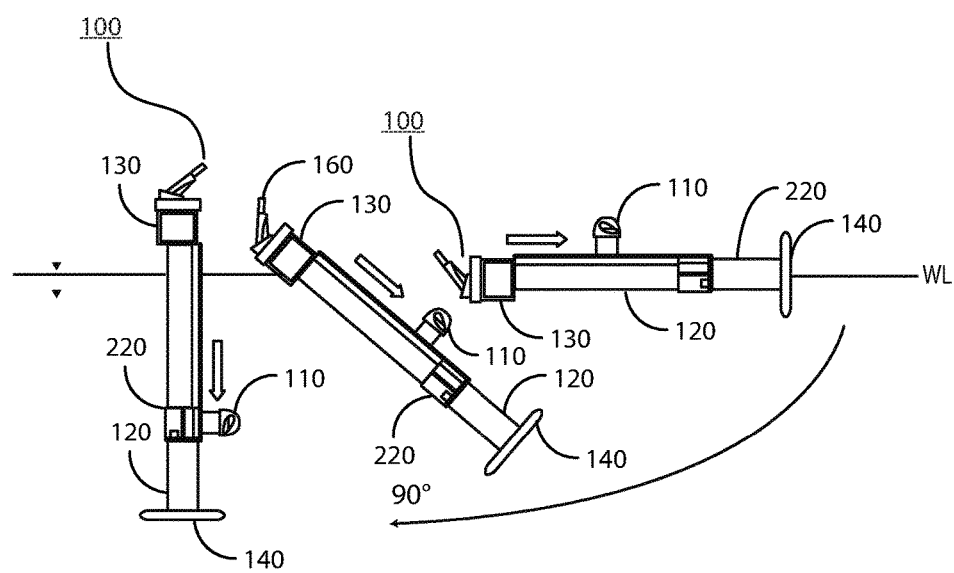

FIGS. 2A and 2B illustrates the transiting and deployment of the floating tower frame ocean current turbine system 100 to an operating site. In towing (e.g., by a boat 210 via towing lines 215) to an operating site as shown in FIG. 2A (viewed from above and looking down on the ocean), the system 100 is allowed to float flat on the ocean surface, to clear shallow areas such as those near a quayside or other littoral area. Once at the operating site as shown in FIG. 2B (which is a side view looking at the end of the system 100), upstream mooring lines (not shown) are attached. When ready for installation of the frame at the operating site, an electric motor and drive gear housed within the turbine base engages a linear gear along the track, thus, the turbine 110 and its base slides coaxially along the track. The motor-gear arrangement drives the turbine on its base towards a collar 220A-E, which is aligned to receive the turbine base from the spar/tower track. As turbines 110A-E move along the respective track 125A-E, toward the bottom end of the spar/tower 120A-E, the center of gravity of the entire frame shifts from the horizontal floating tower central position, used in transiting, to the lower end of the tower near the wing, causing the lower end to sink thereby rotating the frame from horizontal to vertical. This rotation of the frame may be assisted by ballast tanks (not shown) inside the base of the spa/towers 120A-E and/or in the wing 140, and which when flooded stabilizes the frame in its operational vertical position. For long-term overhaul, this rotation process is reversed for towing the system 100 back to quayside. The system 100 is moored to seabed anchor(s) with a number of mooring lines 150. For example, mooring lines 150 are disposed at each end of the truss 130 and wing 140 as shown. Optionally, mooring lines 150 may also be at intermittent points along the length of the truss and wing as the system 100 is made longer to accommodate the thrust load of more spar/towers and turbines.

Figure 3:
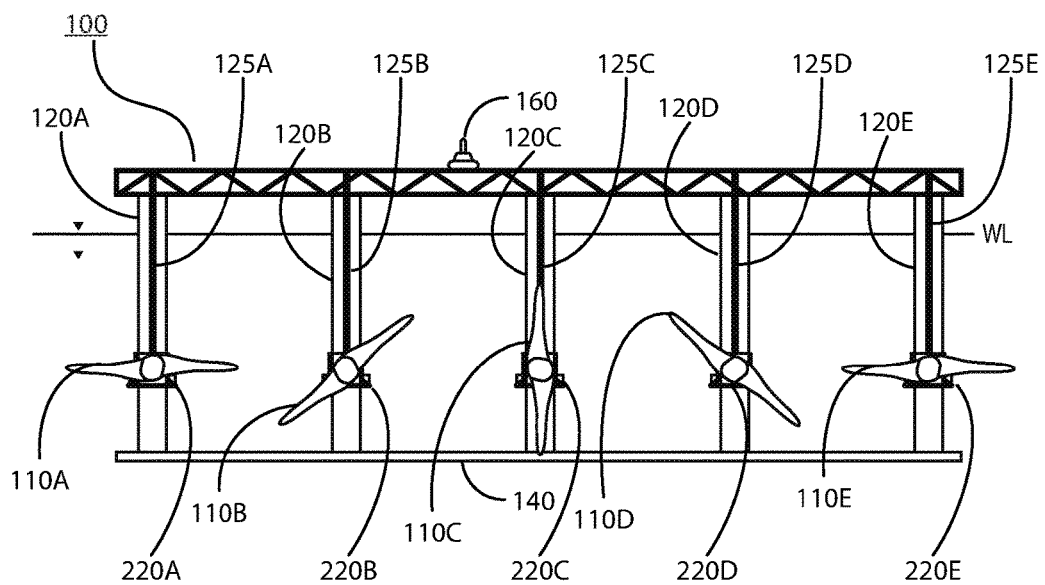
FIG. 3 illustrates a front view of the ocean current turbine system of FIG. 1 in its operating position.

FIG. 3 illustrates a front view of the floating spar/tower frame ocean current turbine system 100 in its operating position. Each turbine 110A-E and the connected turbine base moves along the track and collar yaw (TRAKYAW) system comprising tracks 125A-E and collars 220A-E attached to the towers 120A-E. As shown in more detail in FIG. 4, a TRAKYAW system provides a means of turbine yawing, when in operation. The turbine 110 and its base 112 rides on the vertical track 125. The track 125 provides a means of raising the turbine to the truss 130 above the ocean surface for servicing. Once servicing is completed, a turbine 110 and its base 112 are lowered to the operating position. At the collar 220, the turbine base 112 disengages the track 125 and engages a coupling arrangement similar to the track on the collar. In this position, the turbine 110 is able to yaw around the spar/tower 120 by a collar 220 around the spar/tower 120, on which it is connected. The turbine 110 is coupled to the turbine base 112 via a bearing 114. In an embodiment of the invention, the tower 120 is laminated with low friction material such as teflon or low friction polymer coating on which the collar 220 rotates once it reaches its operating position. Other bearing methods may be used.

Figure 4:
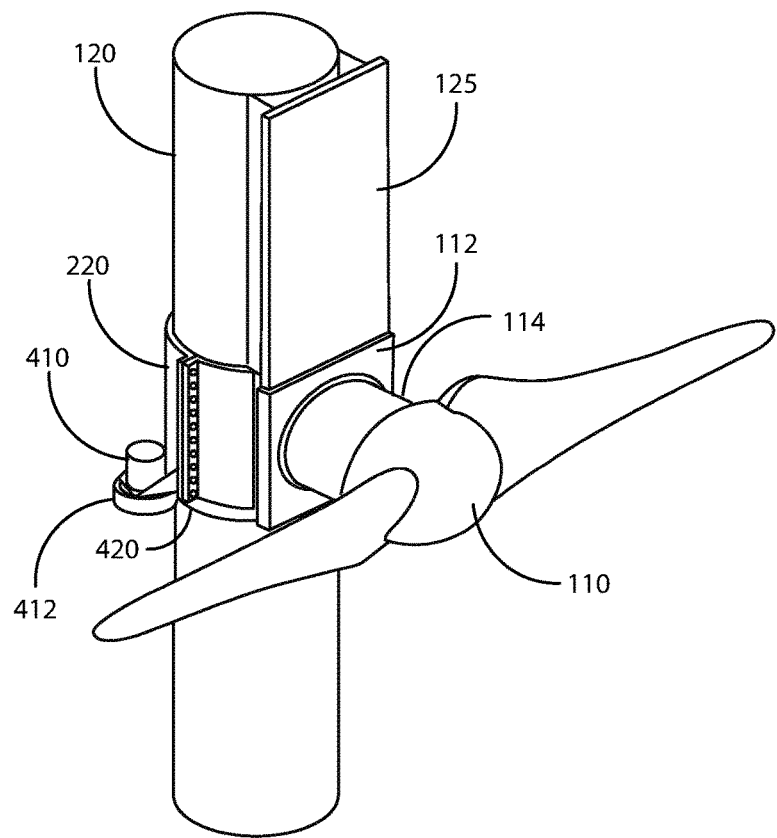
FIG. 4 illustrates a track and collar yaw (TRAKYAW) system attached to a tower according to an embodiment of the invention.

The TRAKYAW system of FIG. 4 comprises hydraulic actuators or electric yaw motors 410 attached to the collar 220. The gears 412 of the yaw motors 410 mesh with a sun gear 420 girdling and connected to the spar/tower 120. Activation of yaw motors 410 rotate the turbine 110 and collar 220 against the sun gear 420 on the tower. In an embodiment of the invention, yaw motor activation is controlled by a current flow direction sensor (not shown). A generator torque control sensor (not shown) may also activate the yaw motor 410. The turbine generator torque control sensor can detect current flow speeds in excesses of the generator system capacity. The turbine controller is programmed to activate the yaw system to reduce the rotor exposure to the flow, thus limiting the rotor torque to the generating system to stay within its rated loads. The following table presents the relationship between the percentage rotor flow exposure and degrees the rotors are off-axis to flow direction.

| Rotor Flow Exposure | Degrees Off-Axis to Flow Direction |
|---|---|
| 100% | 0° |
| 98% | 10° |
| 87% | 20° |
| 71% | 45° |

This method of torque control benefits from using the yaw system for both yawing to squarely face the current to gain maximum current flow energy capture, while also providing a means of shedding current energy in excesses of the turbine's rated capacity. This is particularly important in tidal flows where the force of extreme flow speed must be mitigated to a productive and economic operation range for the turbine. Yawing "out of the flow" avoids variable pitch blades in a rotor prone to failures and high servicing requirements.

Figure 5:
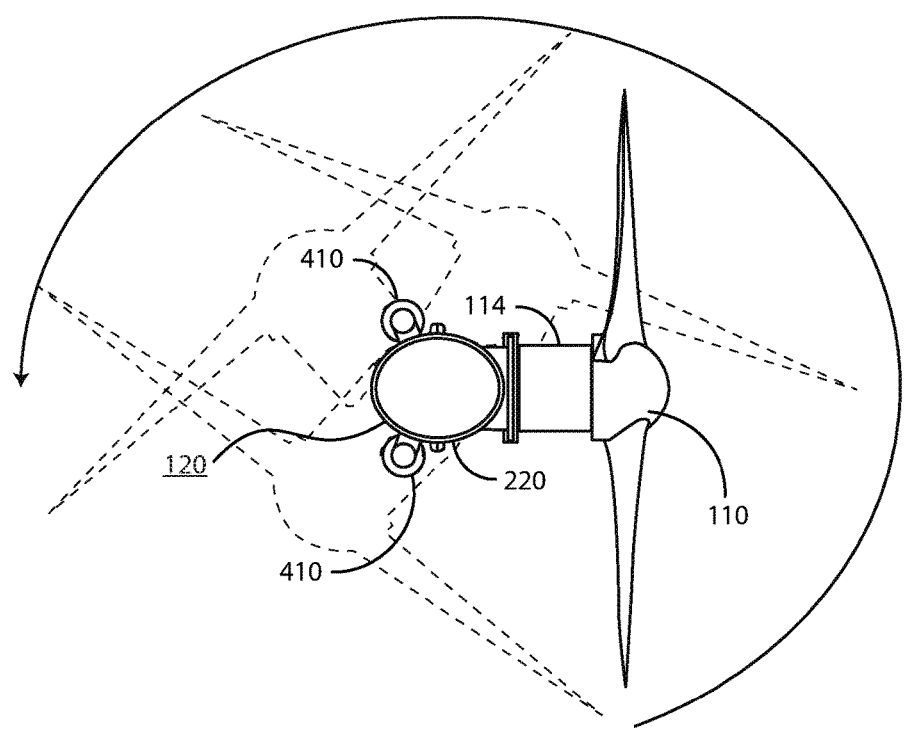
FIG. 5 illustrates a cross-sectional view of the TRAKYAW system of FIG. 4.

FIG. 5 illustrates a cross-sectional view of the TRAKYAW system. When in operation, the collar 220 including its turbine 110 can be rotated or yawed about the tower 120 thereby positioning the rotor blades to squarely face the current flow to optimize the power capture of the current. In an embodiment of the invention, the collar 220 and respective turbine 110 can rotate 350 degrees about the vertical axis of the tower 120. In most tidal currents yawing would be in the range of 150° to 210°.

Figure 6:
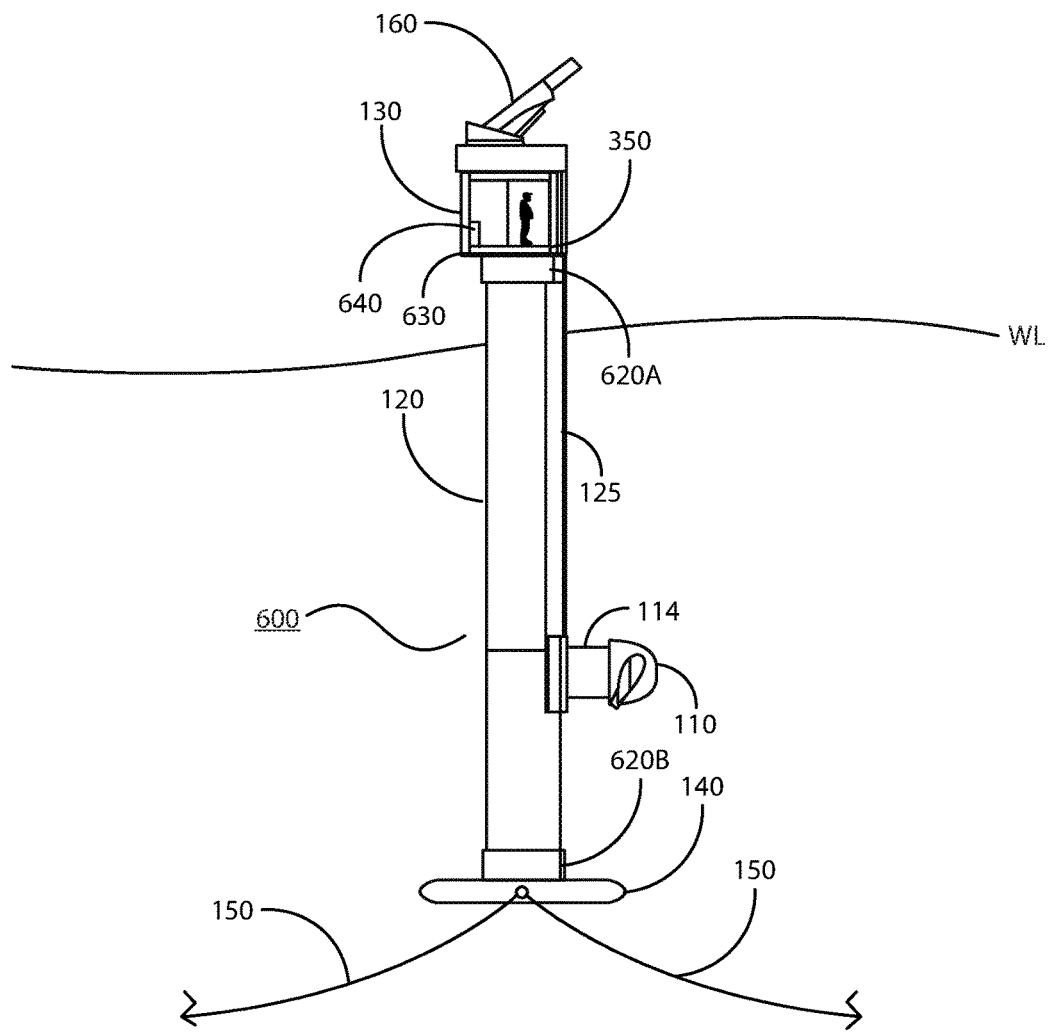
FIG. 6 illustrates a turbine and tower yawing system according to an embodiment of the invention.

FIG. 6 illustrates the side view of a turbine and spar/tower yawing system 600 according to an embodiment of the invention. Here, the turbine yawing system 600 comprises a tower top connection to the truss 130 by a rotatable bearing 620A and a bottom of the tower connection to the wing 140 also by a rotatable bearing 620B. In this configuration there is no collar, and in operation, the turbine 110 and its base, are at the lower end of the track 125. For yawing the spar/tower and turbine, a sun gear 630 girdling the spar/tower top is driven as required by a yaw motor 640 mounted on the bottom of the truss. In this configuration the entire tower 120 and turbine 110 yaws for the rotor to squarely face the flow. The track 125 also serves to access the turbine 110 to the operations deck 350 for servicing.

The TRAKYAW system responds when the flow direction sensor detects a deviation in current direction. The system controller energizes the yaw motors 410 to make a turbine yaw position adjustment upstream of the spar/tower. The TRAKYAW system positions the rotor in the flow much quicker than a passive yaw system, thereby generating power earlier, for overall higher production. This is to be contrasted with a passive yaw system which requires the forces of the flow to yaw the turbine 110, moving it to a downstream position (from the tower). Passive yawing where the rotor is downstream of its support structure can result in damaging cyclic loads, since the rotor blades experience substantial stream flow impedance (shadowing) from a spar/tower, twice on each revolution.

Figure 7:
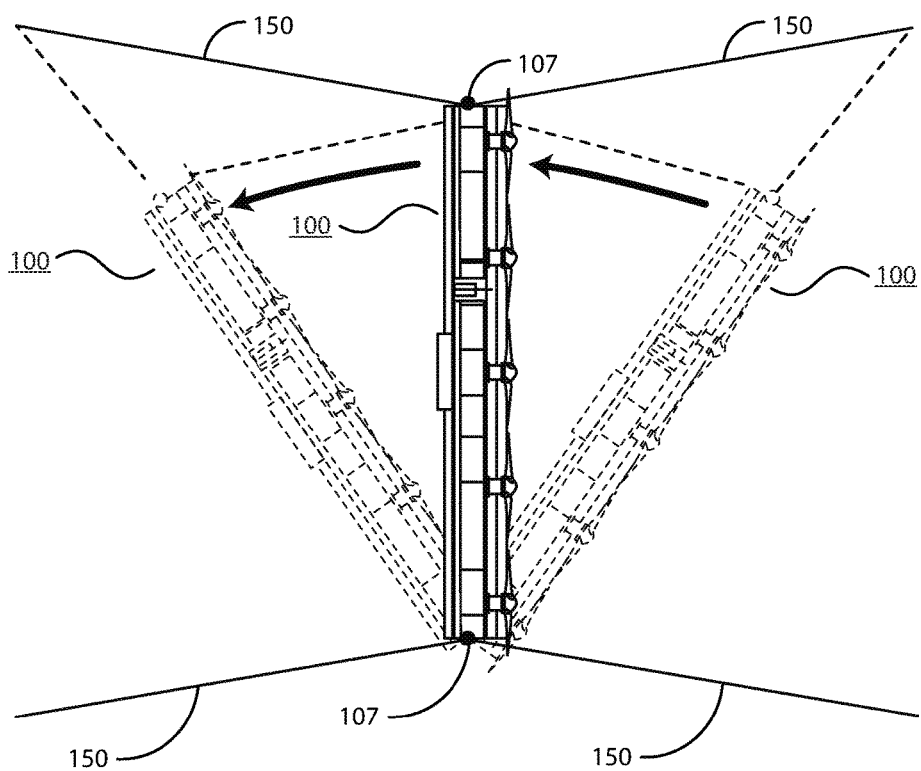
FIG. 7 illustrates a system for changing the azimuth orientation of the ocean current turbine system of FIG. 1.

The preceding TRACKYAW description applies to ocean current turbines operating in tidal flow regimes with periodic flow reversal. In areas where the current usually flows in steady direction with no flow reversal, there may be times when the current meanders and azimuth adjustments in the range of ±20° for the rotors to face the current are required. Under these conditions, the 350° yawing of the individual turbines is not required and the yaw system function may be accomplished by changing the azimuth orientation of the frame as shown in FIG. 7. Here, the floating spar/tower frame ocean current turbine system 100 is viewed from the top looking down onto the ocean surface. An azimuth orientation change is accomplished using the mooring lines 150 at each end of the frame. Rather than being permanently secured to the frame, the mooring lines 150 are instead run across or looped over a winch 107, which is controlled to adjust the upstream and downstream mooring line length to the frame, thus altering the heading of the frame. An optional second winch 107 can be used on the opposite side of the frame. This azimuth positioning control by winching the mooring line(s) 150 provides an alternative method of facing the rotors squarely to the current flow without the need for a yaw system on each turbine.

Depth control of the current turbine system 100 is based on buoyancy of the towers 120A-E and hydrodynamic lift of the wing 140, offsetting the gravity force and downward force vector of the current creating drag on rotors and frame due to mooring to the ocean floor. The drag force from the current on the system 100, moored to the ocean floor has two force vectors: a horizontal (drag) force and a downward force. The downward force is compensated by the added volumetric displacement as the submerged portion of the spars/towers 120 increases, along with the hydrodynamic lift of the wing 140, resulting from the current. The greater the flow speed, the greater the wing lift to offset the downward force component. This balance of upward and downward forces maintains the current turbine system 100 within the operating range of depth for optimum performance.

Figure 8:
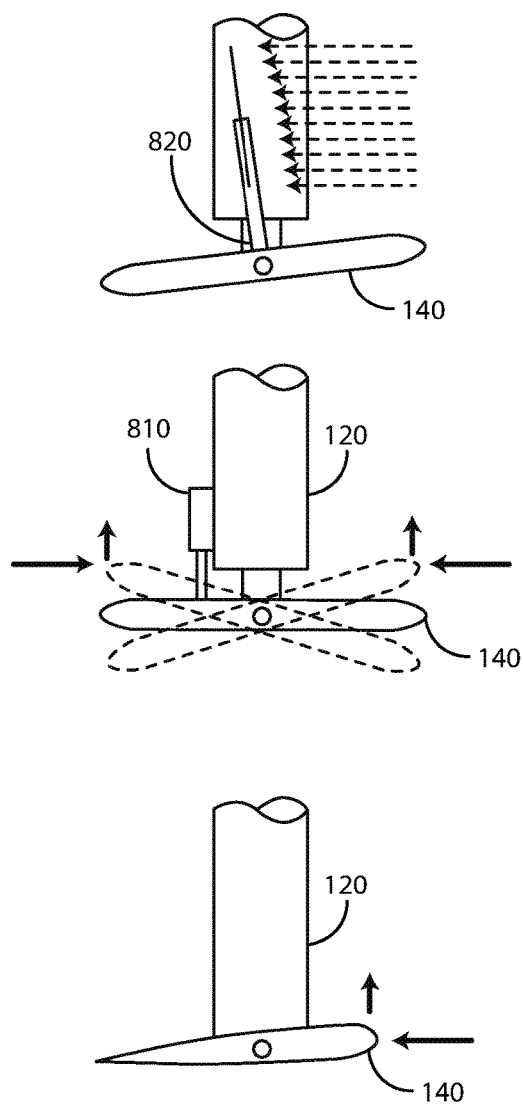
FIG. 8 illustrates three alternative embodiments of the wing of FIG. 1.

FIG. 8 illustrates three alternative embodiments of the wing 140. As shown in the bottom illustration, the wing 140 comprises a hydrodynamic efficient wing in a fixed pitch position connected to the base of the towers 120A-E. This is preferable when operating in a current that flows with no flow reversal (such as the Florida Gulf Stream). However, in a tidal current, the wing 140 can be fitted to pitch actively or passively. For example, as shown in the center illustration, the wing 140 may vary its pitch relative to the spar/tower via an electromechanical or hydraulic activation control mechanism 810 at the base of the towers 120A-E. Here, the control mechanism 810 actively controls the pitch of the wing 140. As shown in the top illustration, the pitch of the wing 140 is passively adjusted via a pivot arm 820, where drag of the current over a drag plate pitches the wing into a position to provide hydrodynamic lift. Adjusting the pitch of the wing 140 provides hydrodynamic lift to the ocean current turbine system 100 and compensates for the downward force vector induced by the current drag on the turbines and the frame moored to the ocean floor. One of ordinary skill in the art readily appreciates that the structure of a wing 140 can be altered before deployment to change its hydrodynamic performance.

The system 100 does not have a connection vessel floating on the surface creating unproductive drag across the current flow; rather, the turbine spar/towers 120A-E present the only ocean surface exposure, which due to their small volumetric displacement in a passing wave and the distance between the towers 120A-E, the hogging and sagging loads become minimal. The current turbine system 100 is designed to avoid loads caused by wave action. These specifically hogging and sagging loads of a surface vessel being lifted by a wave passing along its longitudinal center (hogging) or waves at each end of the wing resulting in reduced support at the center (sagging load). The current turbine system spar/towers extending through the ocean surface provide minimum exposure to wave "slap" loads.

Current shear typically has the highest flow velocity at the surface, dropping to near zero at the ocean floor. A vessel floating on the surface at a cross angle to the current would require massive mooring and anchoring capacity due to drag along the length of the vessel. This not a problem with the current invention since the current turbine system 100 has only the spar/towers below the surface and the low drag wing 140 at the bottom of the spar/towers 120A-E. Therefore the principal drag of the system 100 is from the rotors thereby harnessing the power in the flow and reducing the mooring and anchoring structural requirements.

In this reduced surface exposure design, the current turbine system 100 requires far less structural material and can be made much larger providing a cost competitive advantage. A major cost component of ocean current generating systems is the power cable to shore and the mooring and anchoring. Therefore it is advantageous to have more turbines per system that can utilize the same mooring and anchoring, along with a single power cable.

Figure 9:
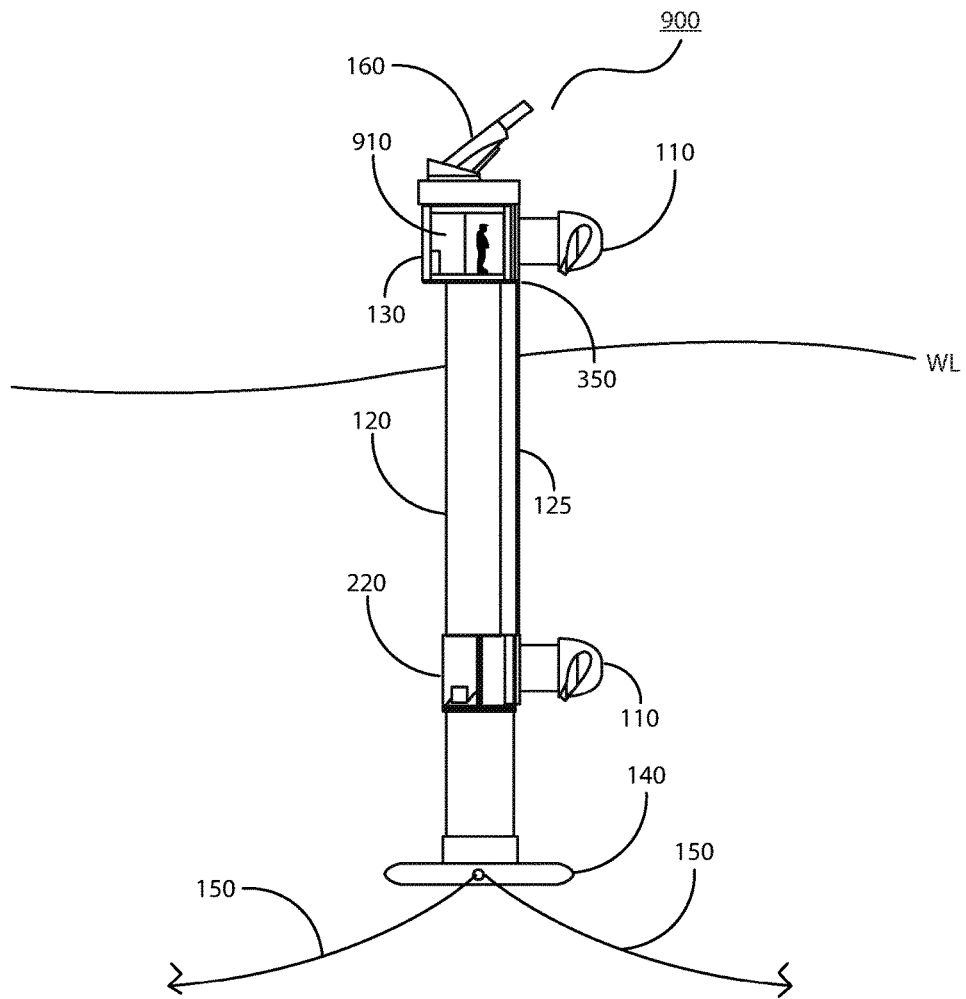
FIG. 9 illustrates a side view of the movement of a turbine system according to an embodiment of the invention.

FIG. 9 illustrates the side view of a current turbine system 900 according to another embodiment of the invention. The box truss structure 130 spans the tops of the spars/towers 120 above the ocean surface and serves as a platform for service crews to board and maintain the turbines 110. The bottom of the box truss 130 is the operations deck 350 while its top serves as a track for the crane 160 to traverse the length of the truss 130 for accessing the turbines 110. The combination of the elevator TRAKYAW system 125 and the crane 160 enables each turbine 110 to be serviced on the operations deck 350 of the truss 130 under most weather and sea conditions. Power generation remains uninterrupted for the rest of the turbines 110B-E while a particular turbine 110A is being serviced.

Located on the operations deck 350 of the truss 130 is an equipment cabin 610 containing electric power conditioning equipment (not shown), This equipment cabin 610 may also contain a hydrostatic motor (not shown) to drive an electric generator (not shown). In this embodiment of the invention, the low speed (RPM), high torque of the turbine, drives a hydrostatic pump (not shown) on a common shaft delivering high pressure hydraulic fluid to the hydrostatic motor driving the generator at high speed (RPM) for efficient power generation. Multiple turbine pumps may feed into a common manifold plumbed to the hydrostatic motor which drives the generator. The electric power is delivered from the generators via a submarine cable to a shore substation.

In another embodiment of the invention, the equipment cabin 610 may also contain a reverse osmosis membrane bank (not shown) whereby the turbines 110A-E drive a sea water pump (not shown) delivering high pressure seawater to the reverse osmosis membrane bank for delivery of fresh water by pipeline connection to a shore receiving station.

Figure 10:
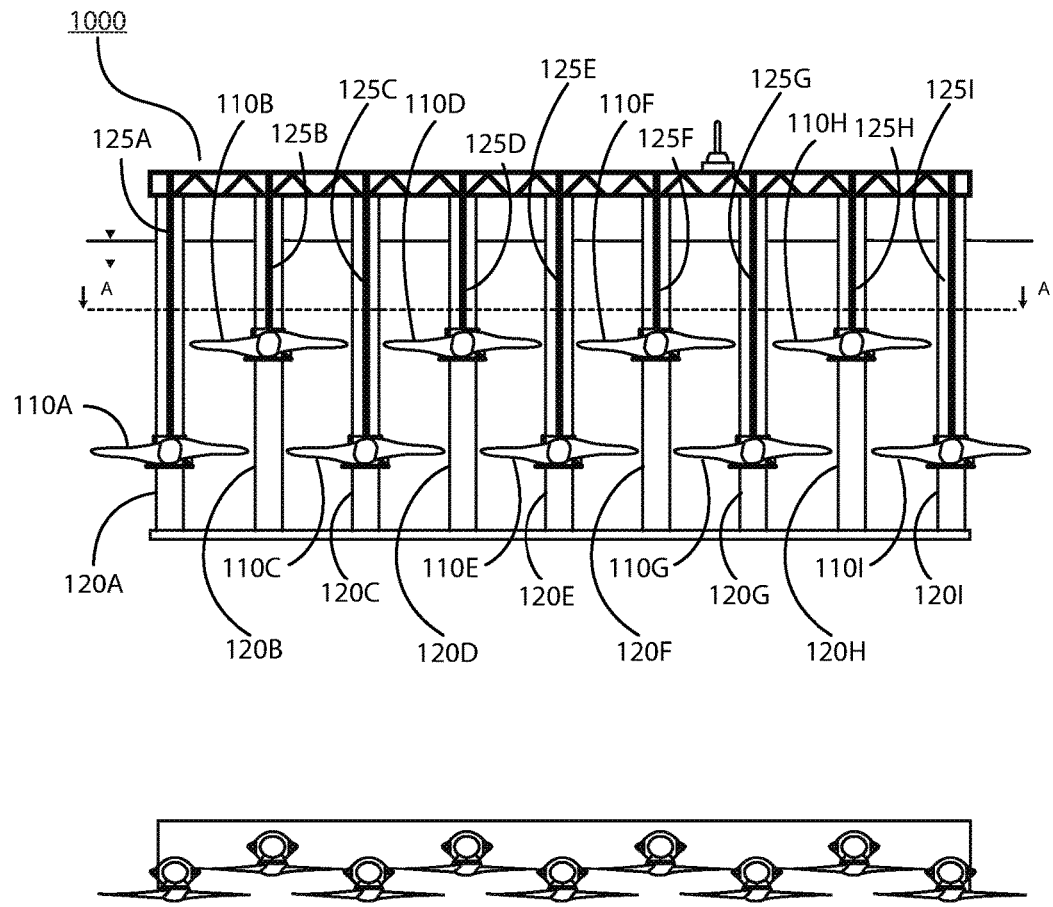
FIG. 10 illustrates an ocean current turbine system according to another embodiment of the invention.

FIG. 10 illustrates a floating spar/tower frame current turbine system 1000 according to another embodiment of the invention. Here, the current turbine system 1000 comprises turbines 110A-I and towers 120A-I with TRAKYAWS 310, truss 130, wing 140, and a crane 160. The turbines 110A-I are offset from one another, i.e., odd turbines 110A, 110C, 110E, 110G, and 110I are located closer to the wing 140 than even turbines 110B, 110D, 110F, and 110H. In other words, multiple rows of turbines 110 are disposed at varying depth. As shown in the cross-sectional view AA, the spar/towers 120A-I are also offset from one another. Such a configuration increases the electric power generating capacity and number of turbines 110 per length of truss 130.

Figure 11:
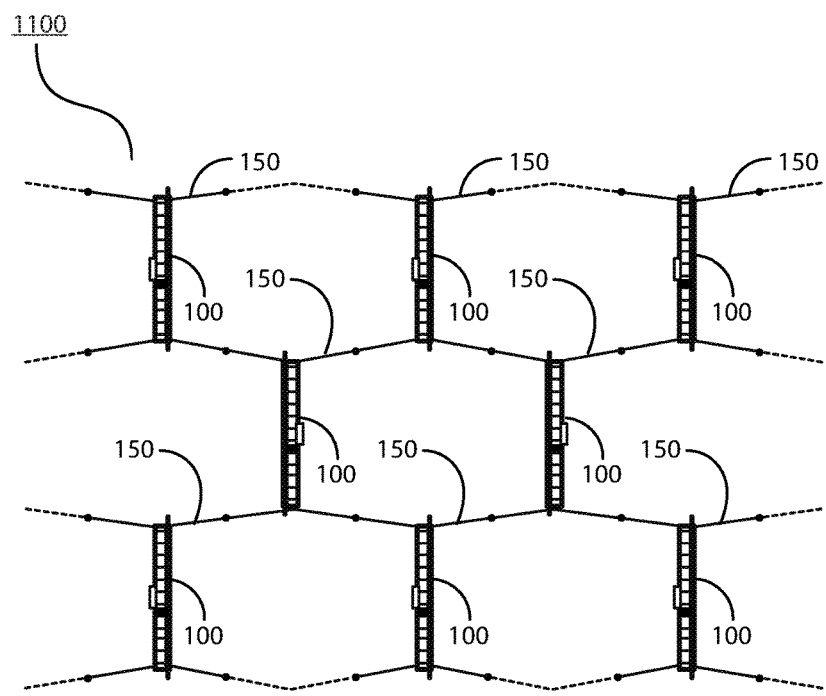
FIG. 11 illustrates a turbine farm utilizing the ocean current turbine system of FIG. 1 according to an embodiment of the invention.

FIG. 11 illustrates a current turbine farm 1100 according to an embodiment of the invention. Here, a plurality of current turbine systems 100 (or 900, 1000) are placed in a honeycomb pattern as shown (looking down from above onto the ocean surface). Any number of current turbine systems 100 may be employed. The current turbine systems 100 are connected to one another via mooring lines 150 and shared anchors (shown by black dots).

Due to the multiple turbines in the embodiments discussed above, its structure may require wider quayside access and more vessels to deploy. Furthermore, the multiple interconnected rotors and tower require substantial structural mass to withstand the loads imposed by high wave states. This has led to the yawing spar tidal turbine design described below where the multiple tower frame structure is eliminated and a single spar and turbine, yawing against a stationary spreader on the spar, provides simplicity of structure, ease of deployment, resiliency to extreme sea state loads, and accessibility for operation and maintenance functions.

Figure 12:
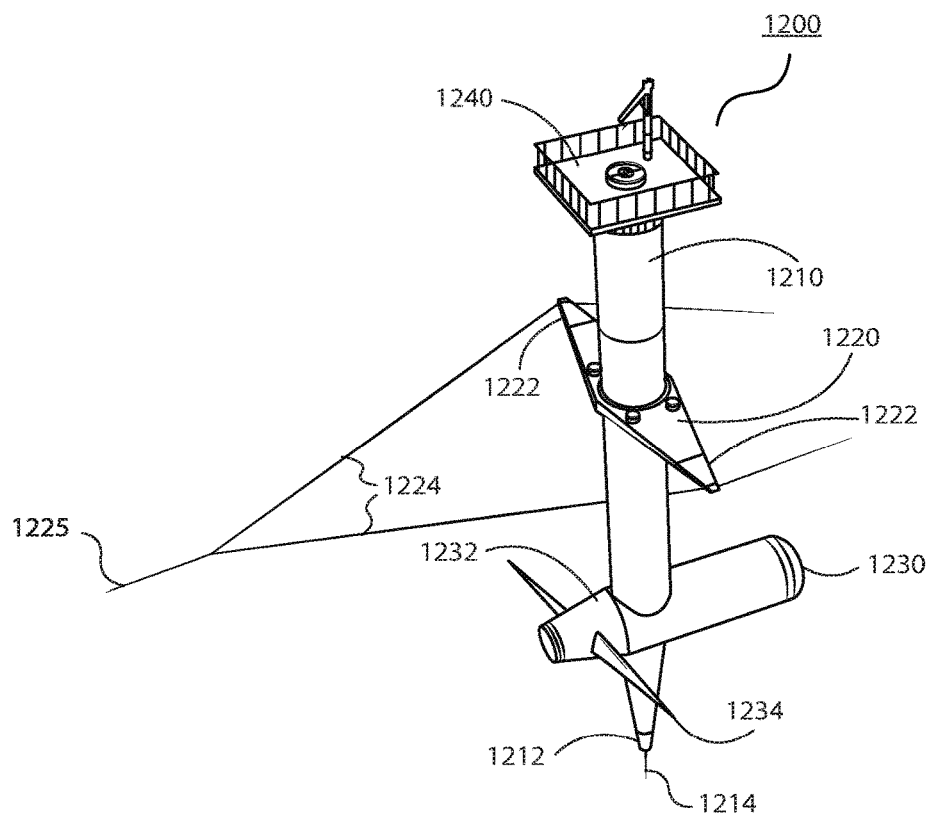
FIG. 12 illustrates a yawing spar turbine according to an embodiment of the invention.

FIG. 12 illustrates a yawing spar turbine 1200 according to an embodiment of the invention. Here, the turbine system 1200 comprises a floating spar buoy 1210, a spreader 1220 disposed on the spar 1210, a turbine drivetrain/generating system in a vessel 1230, and a service deck or platform 1240. The spar 1210 is cylindrical in shape. In an optional embodiment of the invention, the diameter of the spar buoy 1210 decreases at its bottom end (or keel) 1212 starting at the location of the drivetrain/generator turbine vessel 1230. At its lowermost portion, the keel 1212 houses a winch (not shown) that is connected to a vertical mooring line 1214. The winch maintains tension on the mooring line 1214, which is anchored to a seabed. The winch can also adjust the freeboard (depth) of the yawing spar turbine 1200 by taking in or letting out the mooring line 1214. Within the keel 1212 are one or more ballast tanks (not shown), the implementation of which is apparent to one of ordinary skill in the art.

The ballast tanks may be used to adjust the buoyancy of the yawing spar turbine 1200 and keep it upright during operation and with the desired tension on the mooring line 1214. During operation, the spreader 1220 sits below the water line and comprises tips 1222 that serve as connections points for fore and aft cable yokes 1224, which transition to mooring lines 1225 connected to anchors (not shown) on the seabed. The anchors may be gravity anchors and/or suction pile anchors, or other types best suited to the seabed soil composition, the implementation of which are apparent to one of ordinary skill in the art.

The turbine vessel 1230 comprises an upstream rotor 1232 having two or more fixed pitch blades or variable pitch blades 1234 (although only two are shown). The vessel 1230 contains drivetrain and generator (not shown) driven by the rotor 1232. Blade spoilers may be optionally implemented to limit the amount of lift created by the blades 1234. In response to a current or tidal flow, the blades 1234 rotate within the rotor plane producing rotation torque to drive a generator within the turbine vessel 1230, the implementation of which is apparent to one of ordinary skill in the art. Since currents generally flow faster near the surface, in slower flows the yawing spar turbine 1200 will operate closer to the surface, capturing the higher energy close to the surface. In an embodiment of the invention, the yawing, spar turbine 1200 passively adjusts its operating depth through rotor drag whereby higher flow speed results in more rotor drag driving spar and turbine deeper by the downward force vector of the mooring system. This results in the yawing spar turbine 1200 capturing more energy in a tidal flow by adjusting the operating depth to the turbine's rated capacity.

Figure 13:
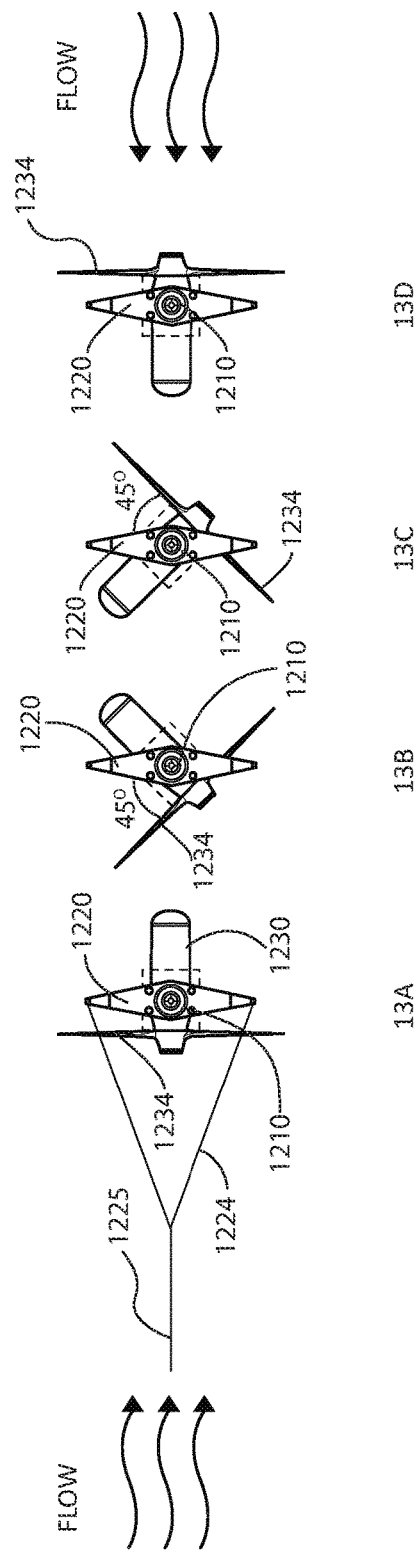
FIG. 13 illustrates exemplary 180 degree yawing of the spar and turbine as the spreader remains stationary.

In an embodiment of the invention, the spar 1210 and the turbine vessel 1230 are able to rotate (yaw) relative to stationary spreader 1220. Referring to FIG. 13, exemplary yawing of the spar 1210, the turbine vessel 1230, and the rotor blades 1234 are shown. Referring to 13A, the rotor blades 1234 and vessel (drivetrain and generator) 1230 are oriented for the rotor to face the flow direction of the current. Referring to 13B, the rotor 1232 and vessel 1230 has rotated forty-five (45) degrees relative to the spreader 1220. Referring to 13C and 13D the spar 1210 and rotor 1232 has rotated a further ninety (90) degrees and one hundred and thirty five (135) degrees respectively relative to the spreader 1220. The spar 1210, vessel 1230 and rotor 1232 rotate (yaw) together three hundred and sixty (360) degrees in either direction relative to the spreader and mooring lines and, this way, the rotor 1232 is always positioned to face the current as the current direction reverses or the current meanders in the same direction.

Figure 14:
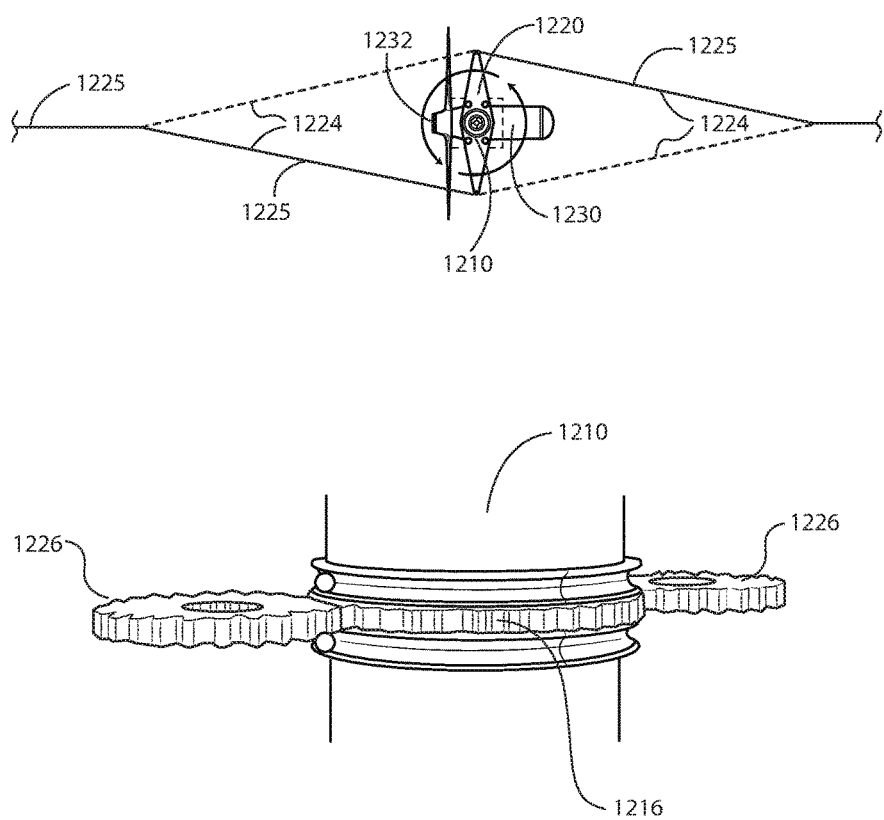
FIG. 14 illustrates a gearing mechanism by which the spreader and turbine are rotated relative to the stationary spreader of the yawing spar turbine of FIG. 12.

In an embodiment of the invention, rotation/yawing of the spar 1210 along with the turbine 1230 is accomplished through one or more yaw motors (not shown) housed within the spreader 1220. Referring to FIG. 14, a ring gear 1216 is fixed on the outside surface of the spar 1210. Actuation of the yaw motors drive gears 1226, which engage the ring gear 1216 to rotate the spar buoy 1210 relative to the spreader 1220. A current flow direction sensor (not shown) is included to detect changes in flow direction. Upon detection of a flow direction change by the sensor, the yaw motors are automatically activated in order to adjust the orientation of the spar 1210 and rotor 1232 relative to the spreader 1220, thereby ensuring that at all times, the rotor plane properly faces the direction of current or tidal flow. For example, if the direction of the water flow changes by forty-five (45) degrees, the spar 1210 and rotor 1232 are rotated forty-five (45) degrees in the direction of the flow to ensure the rotor plane properly faces the new current flow.

Figure 15:
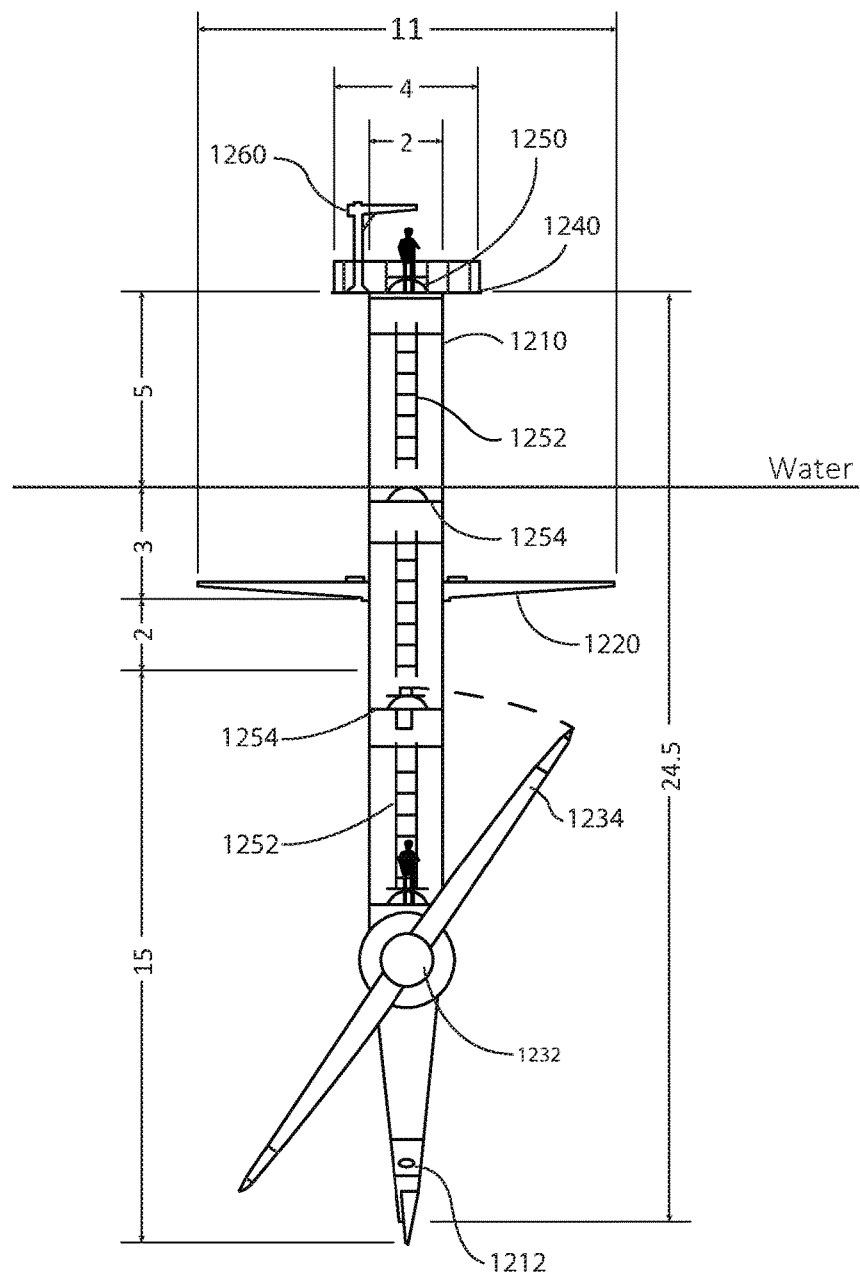
FIG. 15 illustrates the yawing spar turbine interior decks and hatches according to an exemplary embodiment of the invention.

FIG. 15 illustrates the yawing spar turbine 1200 according to an exemplary embodiment of the invention. Referring to the depiction, exemplary dimensions are provided. For example, the height of the spar 1210 (from keel 1212 to platform 1240) is twenty-five (25) meters. The diameter at its maximum girth is two (2) meters. The platform 1240 spans four (4) meters and sits five (5) meters above the water line. From tip to tip, the spreader 1220 spans eleven (11) meters and the spreader 1220 sits three (3) meters below the water line. Also shown are an outer hatch 1250, one or more optional ladders 1252, and one or more optional inner hatches 1254 to allow servicing of a drivetrain and generating equipment. Optionally included is a crane 1260 for raising or lowering heavy parts within the spar 1210.

Figure 16:
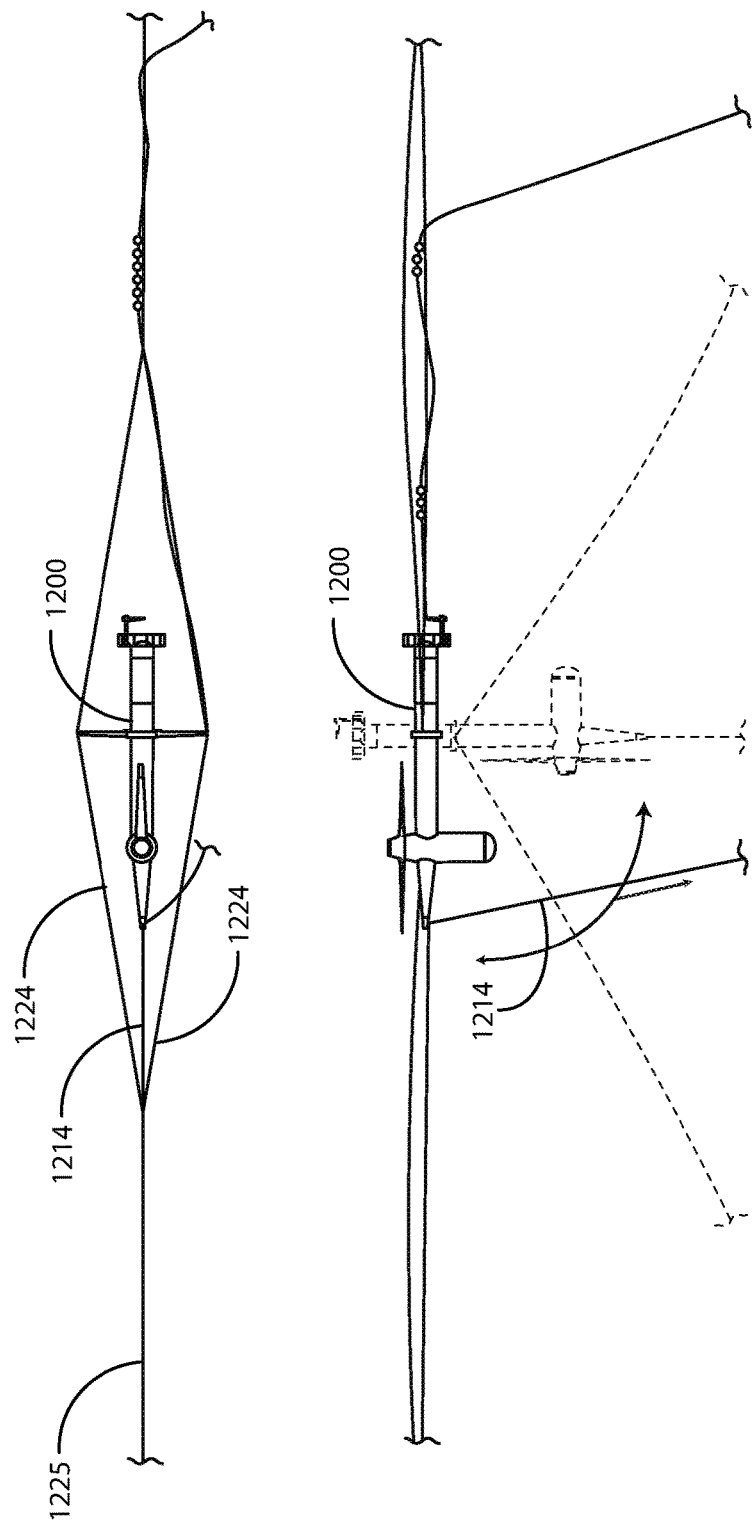
FIG. 16 illustrates deployment of the yawing spar turbine of FIG. 12 according to an embodiment of the invention.

FIG. 16 illustrates deployment of the yawing spar turbine 1200 according to an embodiment of the invention. During transportation, the yawing spar platform 1200 is towed in a horizontal position by the winch mooring line 1214 and the spreader yoke cables. Referring to the top depiction (which is a top view), once at the operating site, the yokes 1224 are connected to the forward and aft mooring lines 1225 and the winch line 1214 is connected to a gravity anchor (not shown). Referring to the bottom depiction (which is a side view), the winch inside the keel 1212 draws the bottom end of the spar 1210 down and may be assisted by flooding of ballast tanks in the keel 1212 to reach a vertical position (shown in shading). The winch is then locked to retain a desired operating depth, or can actively control operating depth in areas of wide tide level range.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A current or tidal turbine comprising:
   a floating spar buoy, the floating spar buoy including a keel at a bottom end;
   a spreader disposed on the floating spar buoy, wherein the spreader comprises outer end connection points for attaching one or more mooring lines connected to one or more anchors;
   a turbine with a drivetrain and generator disposed on and located at a bottom half of the floating spar buoy for converting current or tidal flow into electricity; and
   a yaw motor to drive the floating spar buoy against the spreader to rotate (yaw) the turbine.

2. The current or tidal turbine of claim 1, wherein the keel comprises a winch attached to a vertical mooring line.

3. The current or tidal turbine of claim 2, wherein the keel includes a ballast tank.

4. The current or tidal turbine of claim 3, wherein the current or tidal turbine floats in a horizontal plane during towing to an operating site.

5. The current or tidal turbine of claim 4, wherein flooding of the ballast tank and/or activation of the winch draws the keel down below a waterline and rotates the floating spar into a vertical position.

6. The current or tidal turbine of claim 2, wherein an operating depth of the current or tidal turbine is adjusted through the winch, ballast in the floating spar buoy, and/or current drag on the rotor.

7. The current or tidal turbine of claim 1, wherein the floating spar buoy includes a hatch at a top end and internal ladders to permit serviceman access to a drivetrain of the turbine.

8. A current or tidal turbine comprising:
   a floating spar buoy, the floating spar buoy including a keel at a bottom end;
   a spreader disposed on the floating spar buoy, wherein the spreader comprises outer end connection points for attaching one or more mooring lines connected to one or more anchors; and
   a turbine with a drivetrain and generator disposed on the floating spar buoy for converting current or tidal flow into electricity, the turbine comprising a rotor or a plurality of rotors operating within a rotor plane, and the current or tidal turbine further comprising a yaw motor in the spreader to react against the floating spar buoy and turbine, to effect yawing about a vertical axis so that the rotor plane faces a current or tidal flow, wherein the spreader is stationary about its center vertical axis.

9. The current or tidal turbine of claim 8, further comprising a current or tidal flow direction sensor that activates the yaw motor in response to a change in current or tidal flow direction.

10. The current or tidal turbine of claim 8, wherein the keel extends to a bottom sweep of the rotor plane.

11. A current or tidal turbine comprising:
    a floating spar,
    a turbine drivetrain attached to the floating spar, the turbine drivetrain comprising a main shaft on which a rotor is mounted,
    a spreader above the turbine drivetrain, and
    a yaw motor to drive the floating spar against the spreader to effect yawing of the turbine drivetrain.

12. The current or tidal turbine of claim 11, wherein in operation of the turbine drivetrain, the floating spar floats vertically with its top above a water line and its bottom below the water line, with a center of gravity of the current or tidal turbine located below its center of buoyancy.

13. The current or tidal turbine of claim 11, wherein the spreader comprises lateral ends fixing fore and aft cable yokes to restrain the spreader in a fixed position about a vertical axis.

14. The current or tidal turbine of claim 13, wherein the fore and aft cable yokes prevent the spreader from rotating about its center vertical axis and attach to mooring lines connected to anchors on a seabed.

15. The current or tidal turbine of claim 11, further comprising a winch at a bottom end of the spar, the winch attached to a mooring line extending to an anchor on a seabed.

16. The current or tidal turbine of claim 11, wherein the turbine comprises variable pitch blades.

17. The current or tidal turbine of claim 11, wherein the turbine is serviced by entrance of repair personnel through a hatch on the spar and a decent on ladders internal to the spar.

18. A current or tidal turbine comprising:
    a cylindrical floating spar,
    a turbine drivetrain attached to the cylindrical floating spar, the turbine drivetrain comprising a main shaft on which a rotor is mounted,
    a flow direction sensor for sensing a direction of water flow across the cylindrical floating spar,
    a spreader above the turbine drivetrain, and a yaw motor to position the rotor in the sensed direction of water flow, wherein the spreader is fixed about its center vertical axis by mooring lines and houses the yaw motor and further comprising driving gears engaging a ring gear fixed to an outer perimeter of the spar.

19. The current or tidal turbine of claim 18, wherein the flow direction sensor activates the yaw motor in the spreader to yaw the floating spar and turbine drivetrain to face the water flow.

\* \* \* \* \*